(12) United States Patent
Henttonen et al.

(10) Patent No.: US 10,129,803 B2
(45) Date of Patent: Nov. 13, 2018

(54) CELL SELECTION

(71) Applicant: Nokia Solutions and Networks Oy, Espoo (FI)

(72) Inventors: Tero Henttonen, Espoo (FI); Woonhee Hwang, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/555,621

(22) PCT Filed: Mar. 6, 2015

(86) PCT No.: PCT/EP2015/054733
§ 371 (c)(1),
(2) Date: Sep. 5, 2017

(87) PCT Pub. No.: WO2016/141955
PCT Pub. Date: Sep. 15, 2016

(65) Prior Publication Data
US 2018/0084467 A1    Mar. 22, 2018

(51) Int. Cl.
*H04W 36/00*    (2009.01)
*H04W 36/04*    (2009.01)
(Continued)

(52) U.S. Cl.
CPC ....... *H04W 36/04* (2013.01); *H04W 36/0083* (2013.01); *H04W 48/18* (2013.01); *H04W 48/20* (2013.01)

(58) Field of Classification Search
CPC . H04W 36/04; H04W 36/0083; H04W 48/18; H04W 48/20
(Continued)

(56) References Cited

U.S. PATENT DOCUMENTS

2011/0170481 A1   7/2011  Gomes et al. ............... 370/328
2011/0176424 A1*  7/2011  Yang ................... H04L 41/0803
                                                        370/236.2
(Continued)

FOREIGN PATENT DOCUMENTS

EP        2 207 386 A1     7/2010
WO    WO 2014/191015 A1   12/2014

OTHER PUBLICATIONS

"Extension of Frequency Priorities", Nokia Networks, 3GPP TSG-RAN WG2 Meeting #91, R2-153141, May 2015, 3 pgs.
(Continued)

*Primary Examiner* — Mong-Thuy T Tran
(74) *Attorney, Agent, or Firm* — Harrington & Smith (57) ABSTRACT

A technique including detecting respective pairs of primary and auxiliary priority indicator values for a plurality of radio resources of a radio access network in one or more transmissions by said radio access network; and selecting a cell to adopt as a serving cell based at least partly on both said primary indicator values and said auxiliary indicator values; wherein the primary priority indicator values for said plurality of radio resources provide an indication of the priority order for said plurality of radio resources to a first degree of resolution; and the combinations of primary and auxiliary priority indicator values for said plurality of radio resources provide an indication of the priority order for said plurality of radio resources to a second degree of resolution higher than said first degree of resolution.

14 Claims, 7 Drawing Sheets

| The overall priority value = legacy priority value + (1/(2^x+1) * (sub-priority value+1)) | | | | | | | | | |
|---|---|---|---|---|---|---|---|---|---|
| Number of bits for sub-priority values | Sub-priority value | Legacy priority value | | | | | | | |
| | | 0 | 1 | 2 | 3 | 4 | 5 | 6 | 7 |
| | (None) | 0 | 1 | 2 | 3 | 4 | 5 | 6 | 7 |
| 2 | 0 | 0.2 | 1.2 | 2.2 | 3.2 | 4.2 | 5.2 | 6.2 | 7.2 |
| | 1 | 0.4 | 1.4 | 2.4 | 3.4 | 4.4 | 5.4 | 6.4 | 7.4 |
| | 2 | 0.6 | 1.6 | 2.6 | 3.6 | 4.6 | 5.6 | 6.6 | 7.6 |
| | 3 | 0.8 | 1.8 | 2.8 | 3.8 | 4.8 | 5.8 | 6.8 | 7.8 |

(51) Int. Cl.
*H04W 48/18* (2009.01)
*H04W 48/20* (2009.01)

(58) Field of Classification Search
USPC .................................................. 455/436, 437
See application file for complete search history.

(56) References Cited

U.S. PATENT DOCUMENTS

| | | | | |
|---|---|---|---|---|
| 2011/0250891 | A1* | 10/2011 | Zou | H04W 36/04 |
| | | | | 455/437 |
| 2012/0135738 | A1* | 5/2012 | Yoshihara | H04W 48/18 |
| | | | | 455/436 |
| 2014/0036696 | A1* | 2/2014 | Lee | H04W 48/18 |
| | | | | 370/252 |
| 2014/0242993 | A1* | 8/2014 | Dahlen | H04W 36/0083 |
| | | | | 455/436 |
| 2015/0156690 | A1* | 6/2015 | Futaki | H04W 48/20 |
| | | | | 455/436 |
| 2015/0282058 | A1* | 10/2015 | Forssell | H04W 48/16 |
| | | | | 455/552.1 |
| 2017/0272130 | A1* | 9/2017 | Wang | H04B 7/024 |

OTHER PUBLICATIONS

"Extending Frequency Priorities", Nokia Networks, 3GPP TSG-RAN WG2 Meeting #91, R2-153210, Aug. 2015, 11 pgs.

"Enhanced Fast Acquisition of System Information procedure", Telefon AB LM Ericsson, 3GPP TSG GERAN #51, Tdoc. GP-111231, Aug. 29-Sep. 2, 2011, 5 pgs.

"3$^{rd}$ Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.3.0, Dec. 2014, 37 pgs.

"3$^{rd}$ Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.0, Dec. 2014, 410 pgs.

* cited by examiner

| The overall priority value = legacy priority value + (1/(2^x+1) * (sub-priority value+1)) | | | | | | | | | |
|---|---|---|---|---|---|---|---|---|---|
| Number of bits for sub-priority values | Sub-priority value | Legacy priority value | | | | | | | |
| | | 0 | 1 | 2 | 3 | 4 | 5 | 6 | 7 |
| | (None) | 0 | 1 | 2 | 3 | 4 | 5 | 6 | 7 |
| 2 | 0 | 0.2 | 1.2 | 2.2 | 3.2 | 4.2 | 5.2 | 6.2 | 7.2 |
| | 1 | 0.4 | 1.4 | 2.4 | 3.4 | 4.4 | 5.4 | 6.4 | 7.4 |
| | 2 | 0.6 | 1.6 | 2.6 | 3.6 | 4.6 | 5.6 | 6.6 | 7.6 |
| | 3 | 0.8 | 1.8 | 2.8 | 3.8 | 4.8 | 5.8 | 6.8 | 7.8 |

Figure 8

CELL SELECTION

Cell selection (including cell reselection) in a cellular radio access network involves a communication device deciding on a cell via which to initiate a connection with the access network, or on which to camp in an idle mode to receive e.g. broadcast information and paging.

In order to facilitate e.g. balancing load across the resources of a radio access network, one existing technique involves a radio access network guiding the selection of a serving cell by non-connected/idle communication devices by broadcasting information about the network's preferences for cell selection in the form of priority level indicator values for a plurality of radio resources of the radio access network. Where, for example, a communication device identifies from information in transmissions by the radio access network one or more radio resources having a higher network priority level than that of the current serving cell on which it is camped, the communication device makes measurements of reference signals for one or more cells characterised by those radio resources, as part of the process of selecting a new serving cell.

In more detail, communication devices may be configured on the basis that a radio access network assigns one of eight predetermined priority levels (0 to 7) to each radio resource; and a communication device would look for 3-bit indicators of the priority levels assigned to the radio resources, and make reference signal measurements for one or more cells characterised by the radio resource having the highest one of these eight levels.

The inventors for the present application have identified some shortcomings with this technique, and have identified the aim of providing an enhanced technique.

There is hereby provided a method comprising: detecting respective pairs of primary and auxiliary priority indicator values for a plurality of radio resources of a radio access network in one or more transmissions by said radio access network; and selecting a cell to adopt as a serving cell based at least partly on both said primary indicator values and said auxiliary indicator values; wherein the primary priority indicator values for said plurality of radio resources provide an indication of the priority order for said plurality of radio resources to a first degree of resolution; and the combinations of primary and auxiliary priority indicator values for said plurality of radio resources provide an indication of the priority order for said plurality of radio resources to a second degree of resolution higher than said first degree of resolution.

According to one embodiment, the method further comprises: selecting a cell from a plurality of cells to adopt as serving cell based at least partly on a comparison of said primary priority indicator values for the radio resources for said plurality of cells, and in the event of one or more of said plurality of cells having radio resources with the same primary priority indicator value, additionally on a comparison of said auxiliary priority indicator values for the radio resources for said one or more cells.

According to one embodiment, the method further comprises: calculating a third priority value for the radio resources for each of a plurality of cells from the respective pair of primary and auxiliary priority values for the radio resources, and determining which of said plurality of cells to adopt as serving cell based at least partly on a comparison of said third priority indicator values.

According to one embodiment, said primary indicator value indicates a multiple of a unit value; and said second primary indicator value indicates a multiple of a unit fraction of said unit value.

There is also provided a method comprising: assigning primary priority indicator values and auxiliary priority indicator values to a plurality of radio resources of a radio access network for transmission by said radio access network and detection by one or more communication devices; wherein the primary priority indicator values for said plurality of cells provide an indication of the priority order for said plurality of radio resources to a first degree of resolution; and the combinations of primary and auxiliary priority indicator values for said plurality of radio resources provide an indication of the priority order for said plurality of radio resources to a second degree of resolution higher than said first degree of resolution.

According to one embodiment, the auxiliary priority indicator values are recognisable by at least some communication devices as values to compare in the event of one or more of said radio resources having the same primary priority indicator value, when selecting a cell to adopt as a serving cell.

According to one embodiment, a third priority value for a radio resource is calculable from the respective pair of primary and auxiliary priority values for the radio resource according to one or more predetermined rules known to at least some communication devices.

According to one embodiment, said primary indicator value indicates a multiple of a unit value; and said second primary indicator value indicates a multiple of a unit fraction of said unit value.

There is also hereby provided a method comprising: transmitting primary and auxiliary priority indicator values for one or more radio resources of a radio access network for detection by one or more communication devices; wherein the auxiliary priority indicator value for a radio resource is recognisable to at least some communication devices as an indication of the priority for said radio resource relative to one or more other radio resources having the same primary priority indicator value as said radio resource.

According to one embodiment, the auxiliary priority indicator value for a radio resource is recognisable by at least some communication devices as a value to compare against an auxiliary priority indicator value for one or more other radio resources having the same primary priority indicator value as said radio resource, when selecting a cell to adopt as a serving cell.

According to one embodiment, a third priority value for a radio resource is calculable from the primary and auxiliary priority values for said radio resource according to one or more predetermined rules known to at least some communication devices.

According to one embodiment, said primary indicator value indicates a multiple of a unit value; and said second primary indicator value indicates a multiple of a unit fraction of said unit value.

According to one embodiment, said plurality of radio resources comprises a plurality of carrier frequencies for one or more radio access technologies.

There is also hereby provided an apparatus comprising: a processor and memory including computer program code, wherein the memory and computer program code are configured to, with the processor, cause the apparatus to: detect respective pairs of primary and auxiliary priority indicator values for a plurality of radio resources of a radio access network in one or more transmissions by said radio access network; and select a cell to adopt as a serving cell based at least partly on both said primary indicator values and said auxiliary indicator values; wherein the primary priority indicator values for said plurality of radio resources provide an indication of the priority order for said plurality of radio resources to a first degree of resolution; and the combinations of primary and auxiliary priority indicator values for said plurality of radio resources provide an indication of the priority order for said plurality of radio resources to a second degree of resolution higher than said first degree of resolution.

According to one embodiment, the memory and computer program code are further configured to, with the processor, cause the apparatus to select a cell from a plurality of cells to adopt as serving cell based at least partly on a comparison of said primary priority indicator values for the radio resources for said plurality of cells, and in the event of one or more of said plurality of cells having radio resources with the same primary priority indicator value, additionally on a comparison of said auxiliary priority indicator values for the radio resources for said one or more cells.

According to one embodiment, the memory and computer program code are further configured to, with the processor, cause the apparatus to calculate a third priority value for the radio resources for each of a plurality of cells from the respective pair of primary and auxiliary priority values for the radio resources, and determine which of said plurality of cells to adopt as serving cell based at least partly on a comparison of said third priority indicator values.

According to one embodiment, said primary indicator value indicates a multiple of a unit value; and said second primary indicator value indicates a multiple of a unit fraction of said unit value.

There is also provided an apparatus comprising: a processor and memory including computer program code, wherein the memory and computer program code are configured to, with the processor, cause the apparatus to: assign primary priority indicator values and auxiliary priority indicator values to a plurality of radio resources of a radio access network for transmission by said radio access network and detection by one or more communication devices; wherein the primary priority indicator values for said plurality of cells provide an indication of the priority order for said plurality of radio resources to a first degree of resolution; and the combinations of primary and auxiliary priority indicator values for said plurality of radio resources provide an indication of the priority order for said plurality of radio resources to a second degree of resolution higher than said first degree of resolution.

According to one embodiment, the auxiliary priority indicator values are recognisable by at least some communication devices as values to compare in the event of one or more of said radio resources having the same primary priority indicator value, when selecting a cell to adopt as a serving cell.

According to one embodiment, a third priority value for a radio resource is calculable from the respective pair of primary and auxiliary priority values for the radio resource according to one or more predetermined rules known to at least some communication devices.

According to one embodiment, said primary indicator value indicates a multiple of a unit value; and said second primary indicator value indicates a multiple of a unit fraction of said unit value.

There is also hereby provided an apparatus comprising: a processor and memory including computer program code, wherein the memory and computer program code are configured to, with the processor, cause the apparatus to: transmit primary and auxiliary priority indicator values for one or more radio resources of a radio access network for detection by one or more communication devices; wherein the auxiliary priority indicator value for a radio resource is recognisable to at least some communication devices as an indication of the priority for said radio resource relative to one or more other radio resources having the same primary priority indicator value as said radio resource.

According to one embodiment, the auxiliary priority indicator value for a radio resource is recognisable by at least some communication devices as a value to compare against an auxiliary priority indicator value for one or more other radio resources having the same primary priority indicator value as said radio resource, when selecting a cell to adopt as a serving cell.

According to one embodiment, a third priority value for a radio resource is calculable from the primary and auxiliary priority values for said radio resource according to one or more predetermined rules known to at least some communication devices.

According to one embodiment, said primary indicator value indicates a multiple of a unit value; and said second primary indicator value indicates a multiple of a unit fraction of said unit value.

According to one embodiment, said plurality of radio resources comprises a plurality of carrier frequencies for one or more radio access technologies.

There is also hereby provided a computer program product comprising program code means which when loaded into a computer controls the computer to: detect respective pairs of primary and auxiliary priority indicator values for a plurality of radio resources of a radio access network in one or more transmissions by said radio access network; and select a cell to adopt as a serving cell based at least partly on both said primary indicator values and said auxiliary indicator values; wherein the primary priority indicator values for said plurality of radio resources provide an indication of the priority order for said plurality of radio resources to a first degree of resolution; and the combinations of primary and auxiliary priority indicator values for said plurality of radio resources provide an indication of the priority order for said plurality of radio resources to a second degree of resolution higher than said first degree of resolution.

There is also hereby provided a computer program product comprising program code means which when loaded into a computer controls the computer to: assign primary priority indicator values and auxiliary priority indicator values to a plurality of radio resources of a radio access network for transmission by said radio access network and detection by one or more communication devices; wherein the primary priority indicator values for said plurality of cells provide an indication of the priority order for said plurality of radio resources to a first degree of resolution; and the combinations of primary and auxiliary priority indicator values for said plurality of radio resources provide an indication of the priority order for said plurality of radio resources to a second degree of resolution higher than said first degree of resolution.

There is also hereby provided a computer program product comprising program code means which when loaded into a computer controls the computer to: transmit primary and auxiliary priority indicator values for one or more radio resources of a radio access network for detection by one or more communication devices; wherein the auxiliary priority indicator value for a radio resource is recognisable to at least some communication devices as an indication of the priority for said radio resource relative to one or more other radio resources having the same primary priority indicator value as said radio resource.

Embodiments of the present invention are described in detail hereunder, by way of example only, with reference to the accompanying drawings, in which.

One embodiment is described below for the example of a LTE (Long Term Evolution) network, but the same kind of technique is also applicable to other types of network.

Figure 1:
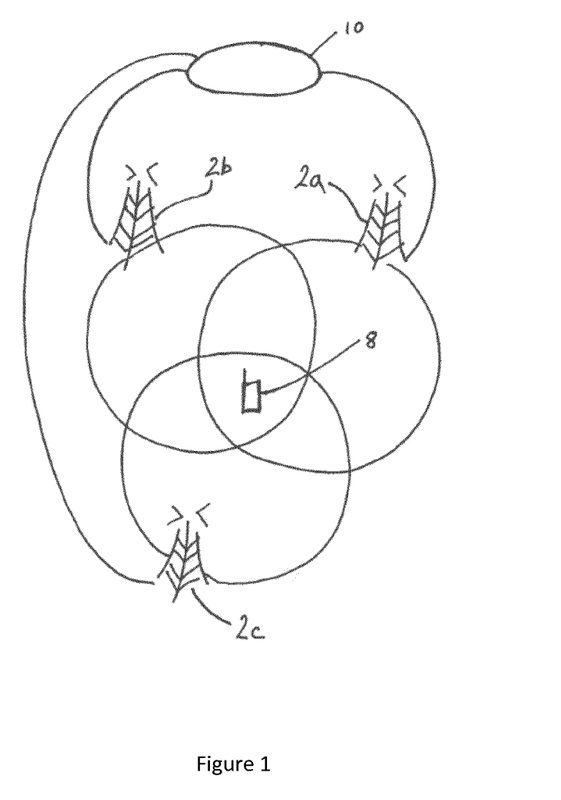
FIG. 1 illustrates an example of a communication device located within the coverage area of a plurality of cells operated by a plurality of access nodes controlled by a common mobile management entity.

FIG. 1 schematically illustrates part of a cellular network. FIG. 1 only shows three access nodes (eNodeBs) 2a, 2b and 2c; but a typical cellular radio access network will comprise thousands of access nodes, each operating a respective cell or group of cells, and collectively providing a wide, continuous coverage area.

In this example, each cell at least partly sharing coverage area with other cells is characterised by a radio access technology (e.g. GSM (Global System for Mobile Communications), WCDMA Wideband Code Division Multiple Access, LTE (Long Term Evolution)), a carrier frequency and a cell bandwidth centred on the carrier frequency. The cells may have different carrier frequencies and/or cell bandwidths. One or more cells may have the same carrier frequency and/or cell bandwidth. The different carrier frequencies may be associated with different radio access technologies; for example, some carrier frequencies may be E-UTRAN (Evolved-Universal Terrestrial Radio Access Network) carrier frequencies, and other carrier frequencies may be GERAN (GSM EDGE Radio Access Network) carrier frequencies. The different carrier frequencies may be referred to as frequency layers, each frequency layer depicting a physical coverage pattern for the respective carrier frequency. The choice of carrier frequencies available to a UE 8 is indicated by those layers whose physical coverage pattern coincides with the current location of the UE 8.

Figure 2:
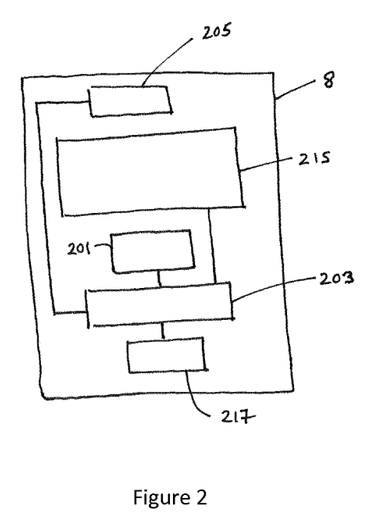
FIG. 2 schematically illustrates an example of apparatus for use at the communication device of FIG. 1.

FIG. 2 shows a schematic view of an example of user equipment 8 that may be used for communicating with at least the eNBs 2a, 2b of FIG. 1 via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals to or from at least the eNBs 2 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part and associated antenna arrangement 205. The antenna arrangement may be arranged internally or externally to the UE 8, and may include a plurality of antennas capable of operating in a multi-layer transmission scheme.

The UE 8 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto.

FIG. 2 shows an example of a UE including a user interface, but the UE may also be a communication device without any user interface, such as a device that is designed for machine type communications (MTC).

Figure 3:
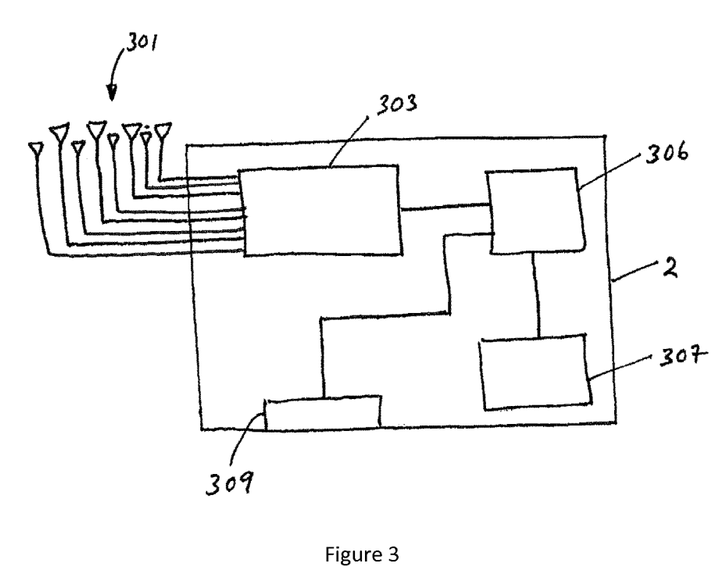
FIG. 3 schematically illustrates an example of apparatus for use at the access nodes of FIG. 1.

FIG. 3 shows an example of apparatus for use at the eNBs 2a, 2b, 2c of FIG. 1. The apparatus comprises a radio frequency antenna array 301 configured to receive and transmit radio frequency signals; radio frequency interface circuitry 303 configured to interface the radio frequency signals received and transmitted by the antenna array 301 and the data processor 306. The radio frequency interface circuitry 303 may also be known as a transceiver. The apparatus also comprises an interface 309 via which it can send and receive information to and from one or more other network nodes such as the O&M entity 10 and other eNBs 2. The data processor 306 is configured to process signals from the radio frequency interface circuitry 303, control the radio frequency interface circuitry 303 to generate suitable RF signals to communicate information to the UE 8 via the wireless communications link, and also to exchange information with other network nodes via the interface 309. The memory 307 is used for storing data, parameters and instructions for use by the data processor 306.

Figure 9:
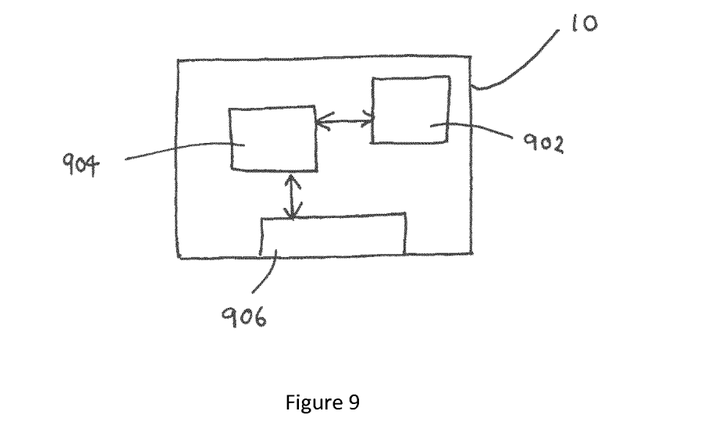
FIG. 9 schematically illustrates an example of apparatus for use at a controlling network entity of FIG. 1.

FIG. 9 shows an example of apparatus for use at the controlling O&M entity 10 of FIG. 1. A data processor 904 is configured to receive cell load information etc. from the eNBs 2 via interface 906, assign priority indicator values to carrier frequencies based on the received cell load information etc., and control the sending of priority indicator values to the eNBs 2 via interface 906. The memory 902 is used for storing data, parameters and instructions for use by the data processor 904.

It would be appreciated that the apparatus shown in each of FIGS. 2, 3 and 9 described above may comprise further elements which are not directly involved with the embodiments of the invention described hereafter.

The three eNBs 2a, 2b, 2c shown in FIG. 1 are controlled by a common controlling entity, such as an operations and maintenance (O&M) entity 10.

Figure 4:
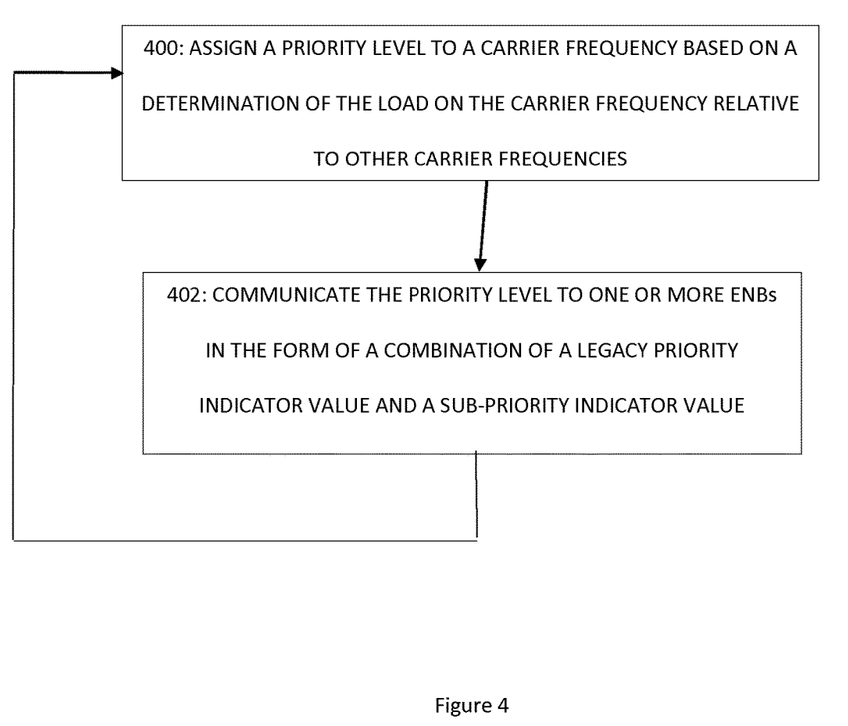
FIG. 4 illustrates an example of operations at a mobile management entity according to one embodiment.

Based on information at O&M 10 about the current and/or future load of the cells and their carrier frequencies in a geographical area, the O&M 10 assigns one of eight legacy priority values to each carrier frequency used in that geographical area, and at the same time additionally assigns one of a predetermined number of sub-priority indicator values to each of those carrier frequencies (STEP 400 of FIG. 4). The O&M 10 may also periodically update the assigned values based on e.g. its estimation the current and/or future load of the cells and their carrier frequencies in a geographical area. The pair of priority indicator values for a carrier frequency are communicated from the O&M 10 to the eNBs 2 operating cells in that geographical area (STEP 402 of FIG. 4 and STEP 500 of FIG. 5)), and the eNBs 2 include the pairs of priority indicator values in system information (e.g. System Information Blocks SIB3, SIB5, SIB6, SIB7, SIB8) broadcast via the cell for detection by UEs 8 within the coverage area of the cell, including UEs 8 not connected to the network (STEP 502 of FIG. 5). The eNBs may also include the priority indicator values in UE-specific messages, such as a message transmitted to a specific UE when a radio resource control (RRC) connection between the network and that UE 8 is released.

One example of including the legacy and sub-priority indicator values in a system information block (e.g. SIB3) is shown below.

```
SystemInformationBlockType3 ::=           SEQUENCE {
     cellReselectionInfoCommon              SEQUENCE {
          q-Hyst                              ENUMERATED {
                                                dB0, dB1, dB2, dB3, dB4, dB5,
dB6, dB8, dB10,
                                                dB12, dB14, dB16, dB18, dB20,
dB22, dB24},
          speedStateReselectionPars           SEQUENCE {
               mobilityStateParameters           MobilityStateParameters,
               q-HystSF         SEQUENCE {
                    sf = Medium                  ENUMERATED {
                                                   dB-6, dB-4, dB-2, dB0},
                    sf-High                      ENUMERATED {
                                                   dB-6, dB-4, dB-2, dB0}
               }
          }                                     OPTIONAL  --
Need OP
     },
          cellReselectionServingFreqInfo    SEQUENCE {
               s-NonIntraSearch                 ReselectionThreshold
          OPTIONAL,
-- Need OP
               threshServingLow                 ReselectionThreshold,
               cellReselectionPriority          CellReselectionPriority
          },
          intraFreqCellReselectionInfo      SEQUENCE {
               q-RxLevMin                       Q-RxLevMin,
               p-Max            P-Max                              OPTIONAL,
-- Need OP
               s-IntraSearch                    ReselectionThreshold
          OPTIONAL,
-- Need OP
               allowedMeasBandwidth             AllowedMeasBandwidth
          OPTIONAL,
-- Need OP
               presenceAntennaPort1             PresenceAntennaPort1,
               neighCellConfig                  NeighCellConfig,
               t-ReselectionEUTRA               T-Reselection,
               t-ReselectionEUTRA-SF            SpeedStateScaleFactors
          OPTIONAL
-- Need OP
     },
     ...,
          lateNonCriticalExtension           OCTET STRING
     OPTIONAL,
     [[ s-IntraSearch-v920                   SEQUENCE {
               s-IntraSearchP-r9                ReselectionThreshold,
               s-IntraSearchQ-r9                ReselectionThresholdQ-r9
          }                                                        OPTIONAL,
-- Need OP
          s-NonIntraSearch-v920              SEQUENCE {
               s-NonIntraSearchP-r9             ReselectionThreshold,
               s-NonIntraSearchQ-r9             ReselectionThresholdQ-r9
          }                                                        OPTIONAL,
-- Need OP
          q-QualMin-r9                       Q-QualMin-r9
          OPTIONAL,  -- Need OP
               threshServingLowQ-r9            ReselectionThresholdQ-r9
          OPTIONAL
-- Need OP
     ]],
     [[ q-QualMinWB-r11                      Q-QualMin-r9
          OPTIONAL -- Cond WB-RSRQ
     ]],
     [[ q-QualMinRSRQ-OnAllSymbols-r12       Q-QualMin-r9
          OPTIONAL
-- Cond RSRQ
     ]],
```

```
        [[ cellReselSubPriority-r13           CellReselSubPriority-r13
        OPTIONAL
        ]]
}
-- ASN1STOP
```

CellReselectionPriority Information Element

```
        -- ASN1START
        CellReselectionPriority ::=         INTEGER (0..7)
        CellReselSubPriority-r13 ::=        INTEGER (0..3)
        -- ASN1STOP
```

Figure 5:
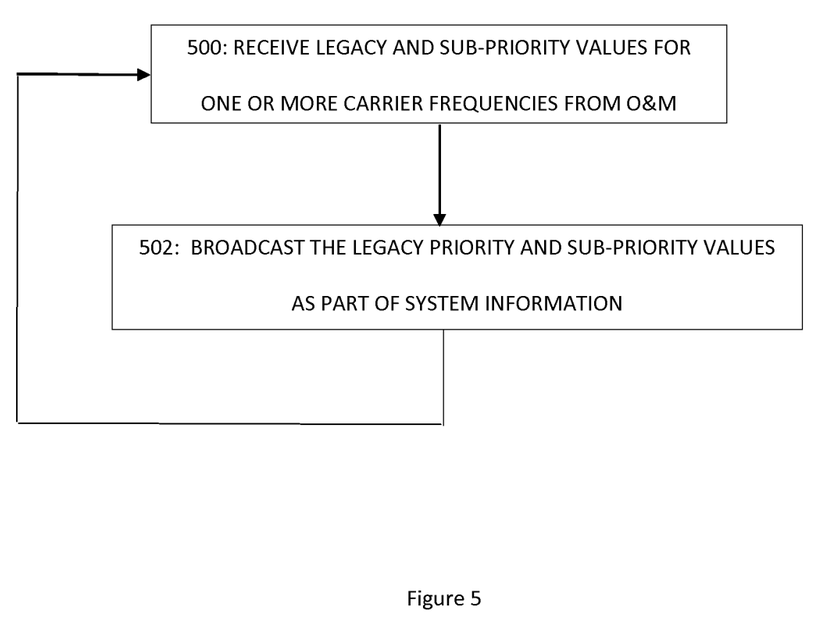
FIG. 5 illustrates an example of operations at an access node according to one embodiment.

As mentioned above, the O&M 10 may periodically update the priority levels assigned to the carrier frequencies used in a geographical area to take into account any changes to the respective loads on the carrier frequencies and cells etc. in that geographical area, and the eNBs 2 similarly update their system information broadcasts etc. according to any change in the priority indicator values received from the O&M 10, as indicated by the return loops in FIGS. 4 and 5.

Figure 6:
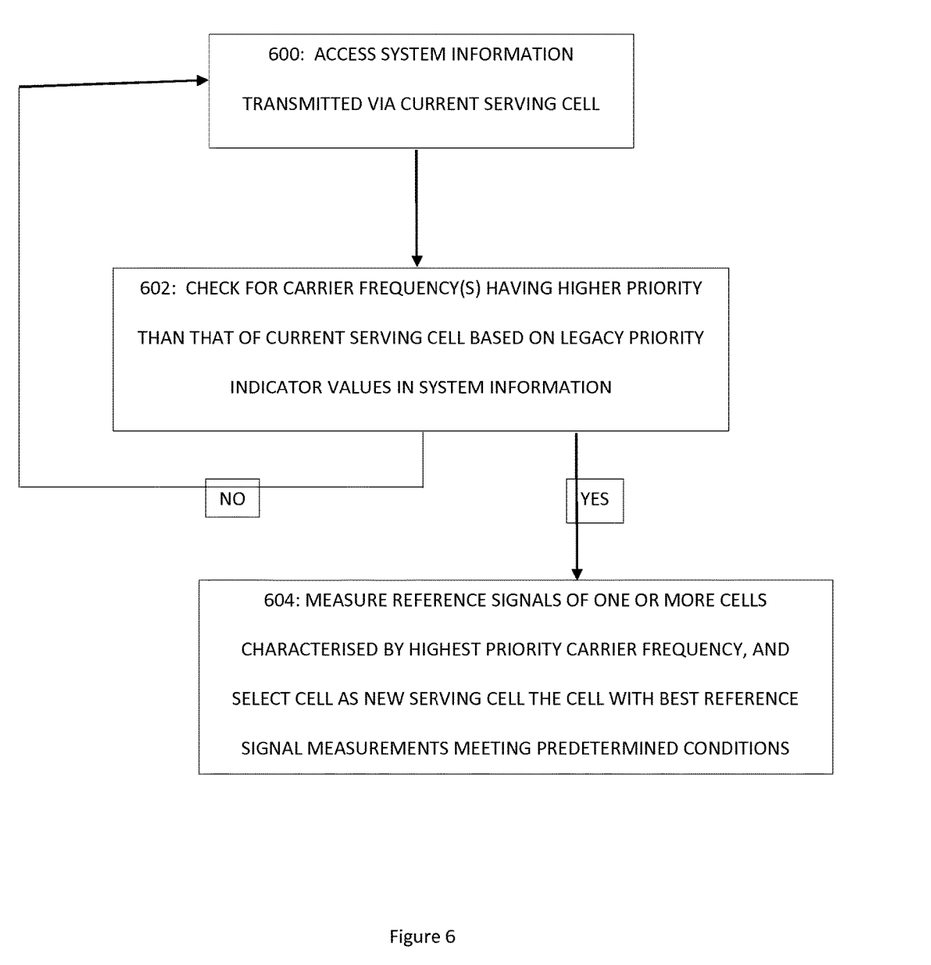
FIGS. 6 and 7 illustrate examples of operations at different types of communication devices according to one embodiment.
Figure 7:
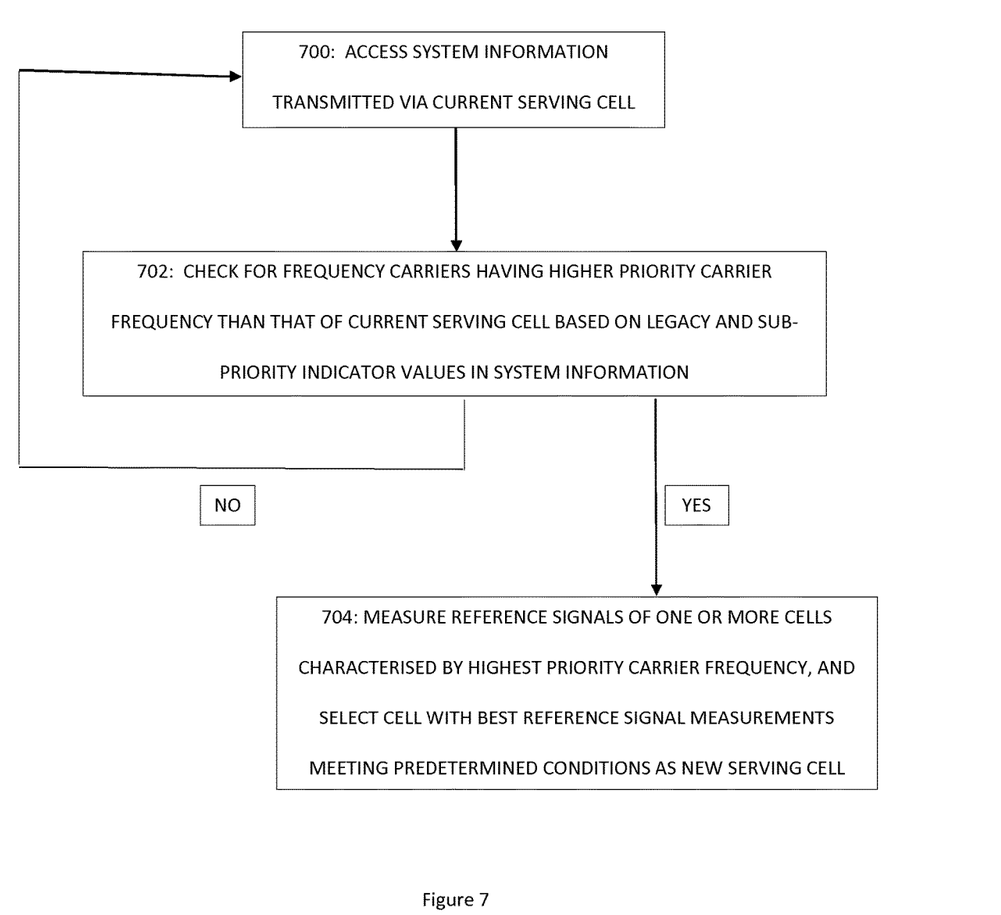

A UE 8 already camped in idle mode on a cell of the network may obtain priority indicator values for all carrier frequencies used in the geographical area of the serving cell from the system information broadcast via the serving cell (STEP 600 of FIG. 6 and STEP 700 of FIG. 7).

Those less-advanced UEs 8 capable of recognising only the e.g. 3-bit legacy priority indicator value from the system information identify the carrier frequency(s) having the highest legacy priority indicator value as the carrier frequency(s) most preferred by the network. These less-advanced UEs check for carrier frequencies having higher network priority than that of the current serving cell by comparing the legacy priority values for the carrier frequency of the current serving cell and the legacy priority values for other carrier frequencies (STEP 602 of FIG. 6). If the UE 8 identifies one or more carrier frequencies having a higher legacy priority indicator value than that of the current serving cell, the UE 8 makes cell reference signal measurements for one or more cells characterised by said one or more carrier frequencies; the UE 8 selects as a new serving cell a cell whose reference signals meet predetermined received power/quality conditions (STEP 604 of FIG. 6); and camps in idle mode on the new serving cell. If two or more carrier frequencies have the same highest, legacy priority indicator value, the UE will treat those two or more carrier frequencies as equally most-preferred by the network; and will select a new serving cell from those cells characterised by those two or more carrier frequencies by e.g. selecting the one of those cells having the best reference signal measurements meeting predetermined received power/quality conditions The more advanced UEs 8 capable of recognising both the e.g. 3-bit legacy priority indicator values and the sub-priority indicator values will check for carrier frequencies having a higher network priority than that of the current cell based on both the legacy priority indicator value and the sub-priority indicator value (STEP 702 of FIG. 7). Examples of how the UE 8 makes such determination are described below. If the carrier frequency determined to have the highest priority based on the legacy and sub-priority indicator values is not the carrier frequency for the current serving cell: the UE 8 makes measurements of the reference signals for a cell characterised by that carrier frequency; selects the cell as new serving cell provided that the reference signals measurements meet the predetermined received power/quality conditions (STEP 704 of FIG. 7); and camps in idle mode on the new serving cell.

According to a first example, the advanced UE 8 first checks for one or more carrier frequencies having the highest legacy priority indicator value. In the event of more than one carrier frequency having the same legacy priority indicator value, the UE compares the sub-priority indicator values for those carrier frequencies. For two or more carrier frequencies with the same legacy priority indicator, the carrier frequency with the highest sub-priority indicator value is identified by the UE as the most preferred by the network.

According to a second example, the advanced UE recognises the sub-priority indicator as an indicator of a multiple of a predetermined unit fraction of a unit value whose multiple is indicated by the legacy priority indicator value. For example, if the predetermined unit fraction (step_size) is 0.2, a combination of a legacy priority indicator value of "001" (binary) and a sub-priority value of "10" (binary) would indicate an overall priority value of 1.6 (decimal). The advanced UE 8 may calculate the overall (actual) priority value according to the following formula:

Overall priority value(decimal)=legacy priority value (decimal)+(step_size*(sub-priority value(decimal)+1))

In more detail, where x bits are used for the sub-priority indicator value, the advanced UE 8 may calculate the overall priority value according to the following formula:

Overall priority value(decimal)=legacy priority value (decimal)+(1/($2^x$+1)*(sub-priority value(decimal)+1)

For example, when the sub-priority indicator is a 2-bit indicator, the sub-priority value indicator could indicate one of four different sub-levels between two consecutive legacy priority levels.

Figure 8:
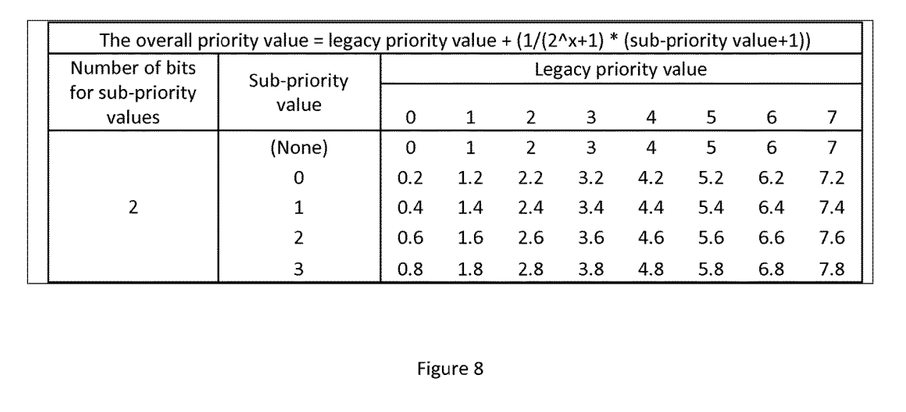
FIG. 8 illustrates an example of determining priority from a combination of primary and auxiliary priority indicators according to one embodiment.

FIG. 8 illustrates the overall priority values for the example of a 3-bit legacy priority indicator value and a 2-bit sub-priority indicator value.

In the example of FIG. 8, the advanced UEs identify any carrier frequency for which no sub-priority indicator value is provided (the system information may additionally include an explicit indication (e.g. 1-bit BOOLEAN indicator) of whether or not a sub-priority indicator is provided for each carrier frequency for which a legacy indicator value is provided) as having a priority level lower than other carrier frequencies having the same legacy priority indicator value and for which any sub-priority indicator value is provided. Accordingly, in this example, one of 40 different priority levels can be assigned to a carrier frequency and communicated to an advanced UE 8.

If the UE 8 identifies no carrier frequency with higher priority than that of the current serving cell, the advanced UE 8 remains camped in idle mode on the current serving cell, but periodically considers the selection of a new cell or carrier frequency on which to camp based on the system information broadcast via the current serving cell, as indicated by the return loop in FIGS. 6 and 7. As mentioned above, the priority indicator values included in the system information may be changed by O&M based on changes in the load etc. on the different carrier frequencies. Similarly, after selecting a new serving cell on which to camp, UE 8 periodically considers the selection of a new cell or carrier frequency on which to camp based on the priority indicator values included in the system information broadcast via the new current serving cell.

In this example, by increasing the overhead by only 2 bits, the network can effectively provide high resolution priority information (one of 40 different priority levels) to advanced UEs, whilst still communicating the relative priority of different carrier frequencies to a lesser resolution (one of 8 different levels) to less advanced UEs. Each carrier frequency is assigned only one priority level (e.g. one of 40 different priority levels in the example of FIG. 8), and the technique deals with the different capabilities of UEs by communicating the priority level by a combination of two priority indicator values. The technique avoids having to simultaneously assign two different priority levels to a single carrier frequency, and broadcast indicators of both different priority levels, which would complicate network operations, and add undesirable complexity and overhead to the SIB broadcasts.

In one alternative embodiment, the sub-priority indicator value takes the form of a single bit BOOLEAN indicator, and the advanced UE determines the overall priority values for a group of carrier frequencies based on this BOOLEAN indicator value and one or more predetermined rules. For the example of cell reselection, the one or more predetermined rules could include the rules that higher priority is given to cells (including the current serving cell) having the same carrier frequency as the current serving cell (intra-frequency cell reselections) than to cells having a carrier frequency different to that of the serving cell, and that higher priority is given to cells operating according to the same radio access technology (RAT) as that of the current serving cell (intra-RAT cell reselections) than to cells operating according to a RAT different to that of the current serving cell.

For example, the carrier frequencies available to a UE 8 in idle mode may be a total of 4 carrier frequencies F1 to F4 (1 intra-frequency, 2 inter-frequency and 1 inter-RAT).

Below are examples of how BOOLEAN sub-priority indicator value(s) for these carrier frequencies can be included in broadcast system information.

```
SystemInformationBlockType3 ::=         SEQUENCE {
    cellReselectionServingFreqInfo          SEQUENCE {
        s-NonIntraSearch                ReselectionThreshold
    OPTIONAL, -- Need OP
        threshServingLow                ReselectionThreshold,
        cellReselectionPriority             CellReselectionPriority
    }
    [[ cellReselSubPriority-r13              BOOLEAN     OPTIONAL
    ]]
}
-- ASN1STOP
SIB3: Intra-frequency reselection priority information
SystemInformationBlockType5 ::=         SEQUENCE {
    interFreqCarrierFreqList            InterFreqCarrierFreqList,
    ...,
    lateNonCriticalExtension            OCTET STRING   (CONTAINING
SystemInformationBlockType5-v8h0-IEs)                  OPTIONAL,
}
InterFreqCarrierFreqInfo ::= SEQUENCE {
    cellReselectionPriority             CellReselectionPriority
    OPTIONAL, -- Need OP
    [[ cellReselSubPriority-r13              BOOLEAN     OPTIONAL
    ]]
}
-- ASN1STOP
SIB5: LTE Inter-frequency reselection priority information
-- ASN1START
SystemInformationBlockType6 ::=         SEQUENCE {
    carrierFreqListUTRA-FDD             CarrierFreqListUTRA-FDD
    OPTIONAL, -- Need OR
    carrierFreqListUTRA-TDD             CarrierFreqListUTRA-TDD
    OPTIONAL, -- Need OR
}
CarrierFreqListUTRA-FDD ::=    SEQUENCE (SIZE (1..maxUTRA-FDD-
Carrier)) OF CarrierFreqUTRA-FDD
CarrierFreqUTRA-FDD ::=        SEQUENCE {
    cellReselectionPriority             CellReselectionPriority
    OPTIONAL, -- Need OP
    ...,
    [[ cellReselSubPriority-r13                    BOOLEAN     OPTIONAL
    ]]
}
CarrierFreqListUTRA-TDD ::=    SEQUENCE (SIZE (1..maxUTRA-TDD-
Carrier)) OF CarrierFreqUTRA-TDD
CarrierFreqUTRA-TDD ::=        SEQUENCE {
    cellReselectionPriority             CellReselectionPriority
    OPTIONAL, -- Need OP
    ...
    [[ cellReselSubPriority-r13                    BOOLEAN     OPTIONAL
    ]]
```

```
}
-- ASN1STOP
SIB6 : UMTS, Inter-RAT reselection priority information
```

Since the total number of carrier frequencies for which priority value indicators are detected by UE 8 in broadcast system information is 4, the UE determines the step_size (of the kind mentioned above for a different embodiment) to be ¼=0.25.

If, for example, the legacy priority indicator values and the BOOLEAN sub-priority values for the four carrier frequencies are as follows:

F1: LTE intra-frequency carrier: legacy priority=1, sub-priority=TRUE
F2: LTE inter-frequency carrier: legacy priority=1, sub-priority=TRUE
F3: LTE inter-frequency carrier: legacy priority=1, sub-priority=FALSE
F4: LTE inter-RAT carrier: legacy priority=1, sub-priority=TRUE then, the UE would (i) assign sub-priority values to the four carrier frequency carriers based on the BOOLEAN sub-priority indicator and the above-mentioned rules, as follows: F1: 1 F2: 2 F3: 4 F4: 3; and (ii) determine the overall (actual) priority values as follows:

F1: 1+(4−1)*0.25=1.75 (highest priority carrier)
F2: 1+(4−2)*0.25=1.5
F3: 1+(4−4)*0.25=1.0 (sub-priority=FALSE, so no additions)
F4: 1+(4−3)*0.25=1.25

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:

detecting respective pairs of primary priority indicator values and auxiliary priority indicator values for a plurality of radio resources of a radio access network in one or more transmissions by said radio access network;

selecting a cell to adopt as a serving cell based at least partly on both said primary priority indicator values and said auxiliary priority indicator values;

wherein combinations of the primary and auxiliary priority indicator values for said plurality of radio resources provide an indication of a priority order for said plurality of radio resources;

calculating the combinations as third priority indicator values for the plurality of radio resources for a plurality of cells from respective pairs of the primary and auxiliary priority indicator values for the plurality of radio resources; and determining which of said plurality of cells to adopt as the serving cell based at least partly on a comparison of said third priority indicator values and said priority order corresponding to said third priority indicator values, wherein said primary priority indicator values indicate a first integer value of a first range of values; and wherein said auxiliary priority indicator values indicate a second integer value of a second, different range of values.

2. A method according to claim 1, wherein said plurality of radio resources comprises a plurality of carrier frequencies for one or more radio access technologies.

3. A method according to claim 1, wherein calculating a third priority indicator value further comprises calculating the third priority indicator using a formula that determines a decimal value for the third priority indicator value using both the first and second integer values.

4. A method according to claim 3, wherein the formula is the following:

Overall priority value (decimal) legacy priority value (decimal)+(1/($2^x$+1))*(sub-priority value (decimal)+1), wherein the Overall priority value is the third priority indicator value, the legacy priority value is the primary priority indicator value, the x is the number of bits used for the auxiliary priority indicator value, the sub-priority value is the auxiliary priority indicator value, and "(decimal)" indicates the corresponding value is a decimal value.

5. A method comprising:

transmitting a primary priority indicator value and an auxiliary priority indicator value for one or more radio resources of a radio access network;

wherein combinations of the primary and auxiliary priority indicator values for a plurality of radio resources are recognisable to one or more communication devices as an indication of a priority order for radio resources relative to other ones of the plurality of radio resources; and wherein third priority indicator values for a radio resource are calculable from one or more of respective pairs of the primary and auxiliary priority indicator values for said radio resource according to one or more predetermined rules known to at least some communication devices and are useful for determining a serving cell using one or more of the plurality of radio resources based at least partly on a comparison of said third priority indicator values and said priority order corresponding to said third priority indicator values, wherein said primary priority indicator value indicates a first integer value of a first range of values; and wherein said auxiliary priority indicator value indicates a second integer value of a second, different range of values.

6. A method according to claim 5, wherein the third priority indicator value is calculable based on the one or more predetermined rules using a formula that determines a decimal value for the third priority indicator value using both the first and second integer values.

7. A method according to claim 6, wherein the formula is the following:

Overall priority value (decimal)=legacy priority value (decimal)+(1/(2$^x$+1)*(sub-priority value (decimal)+1), wherein the Overall priority value is the third priority indicator value, the legacy priority value is the primary priority indicator value, the x is the number of bits used for the auxiliary priority indicator value, the sub-priority value is the auxiliary priority indicator value, and "(decimal)" indicates the corresponding value is a decimal value.

8. An apparatus comprising:
a processor and memory including computer program code,
wherein the memory and computer program code are configured to, with the processor, cause the apparatus to:
detect respective pairs of primary priority indicator values and auxiliary priority indicator values for a plurality of radio resources of a radio access network in one or more transmissions by said radio access network;
select a cell to adopt as a serving cell based at least partly on both said primary priority indicator values and said auxiliary priority indicator values;
wherein the combinations of the primary and auxiliary priority indicator values for said plurality of radio resources provide an indication of a priority order for said plurality of radio resources with a higher resolution than said first priority order;
calculate the combinations as third priority indicator values for the plurality of radio resources for a plurality of cells from the respective pairs of the primary and auxiliary priority indicator values for the plurality of radio resources; and
determine which of said plurality of cells to adopt as serving cell based at least partly on a comparison of said third priority indicator values and said priority order corresponding to said third priority indicator values, wherein said primary priority indicator values indicate a first integer value of a first range of values; and wherein said auxiliary priority indicator values indicate a second integer value of a second, different range of values.

9. An apparatus according to claim 8, wherein calculating a third priority indicator value further comprises calculating the third priority indicator using a formula that determines a decimal value for the third priority indicator value using both the first and second integer values.

10. An apparatus according to claim 9, wherein the formula is the following:

Overall priority value (decimal)=legacy priority value (decimal)+(1/(2$^x$+1)*(sub-priority value (decimal)+1), wherein the Overall priority value is the third priority indicator value, the legacy priority value is the primary priority indicator value, the x is the number of bits used for the auxiliary priority indicator value, the sub-priority value is the auxiliary priority indicator value, and "(decimal)" indicates the corresponding value is a decimal value.

11. An apparatus comprising:
a processor and memory including computer program code,
wherein the memory and computer program code are configured to, with the processor, cause the apparatus to:
transmit a primary priority indicator value and an auxiliary priority indicator value for one or more radio resources of a radio access network;
wherein combinations of the primary and the auxiliary priority indicator values for a plurality of radio resources are recognisable to one or more communication devices as an indication of a priority order for radio resources relative to other ones of the plurality of radio resources; and
wherein third priority indicator values for a radio resource are calculable from one or more of respective pairs of the primary and auxiliary priority indicator values for said radio resource according to one or more predetermined rules known to at least some communication devices and are useful for determining a serving cell using one or more of the plurality of radio resources based at least partly on a comparison of said third priority indicator values and said priority order corresponding to said third priority indicator values, wherein said primary priority indicator value indicates a first integer value of a first range of values; and wherein said auxiliary priority indicator value indicates a second integer value of a second, different range of values.

12. An apparatus according to claim 11, wherein said plurality of radio resources comprises a plurality of carrier frequencies for one or more radio access technologies.

13. An apparatus according to claim 11, wherein the third priority indicator value is calculable based on the one or more predetermined rules using a formula that determines a decimal value for the third priority indicator value using both the first and second integer values.

14. An apparatus according to claim 13, wherein the formula is the following:

Overall priority value (decimal)=legacy priority value (decimal)+(1/(2$^x$+1)*(sub-priority value (decimal)+1), wherein the Overall priority value is the third priority indicator value, the legacy priority value is the primary priority indicator value, the x is the number of bits used for the auxiliary priority indicator value, the sub-priority value is the auxiliary priority indicator value, and "(decimal)" indicates the corresponding value is a decimal value.

\* \* \* \* \*

UNITED STATES PATENT AND TRADEMARK OFFICE
CERTIFICATE OF CORRECTION

PATENT NO. : 10,129,803 B2
APPLICATION NO. : 15/555621
DATED : November 13, 2018
INVENTOR(S) : Tero Henttonen and Woonhee Hwang Page 1 of 1

It is certified that error appears in the above-identified patent and that said Letters Patent is hereby corrected as shown below:

In the Claims

In Claim 4:
Column 14, Line 54, "(decimal) legacy" should be deleted and -- (decimal) = legacy -- should be inserted.

Signed and Sealed this
Twenty-fifth Day of December, 2018

Andrei Iancu
*Director of the United States Patent and Trademark Office*